United States Patent
Murayama et al.

(10) Patent No.: US 7,652,567 B2
(45) Date of Patent: Jan. 26, 2010

(54) PLANT MONITORING APPARATUS AND PLANT MONITORING METHOD

(75) Inventors: Dai Murayama, Tokyo (JP); Akimasa Nakai, Saitama-Ken (JP); Masuo Yamasaki, Tokyo (JP); Yutaka Iino, Kanagawa-Ken (JP); Yasuo Takagi, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 371 days.

(21) Appl. No.: 11/652,511

(22) Filed: Jan. 12, 2007

(65) Prior Publication Data

US 2007/0172018 A1 Jul. 26, 2007

(30) Foreign Application Priority Data

Jan. 17, 2006 (JP) ............................. 2006-008653

(51) Int. Cl.
*G08B 19/00* (2006.01)
(52) U.S. Cl. ..................... 340/521; 340/517; 340/522; 340/825.36; 340/825.49
(58) Field of Classification Search ................ 340/506, 340/517, 521, 522, 524, 525, 825.36, 825.49
See application file for complete search history.

(56) References Cited

U.S. PATENT DOCUMENTS

| | | | |
|---|---|---|---|
| 5,400,246 A * | 3/1995 | Wilson et al. | 700/17 |
| 5,581,242 A | 12/1996 | Arita et al. | |
| 2002/0055790 A1 | 5/2002 | Havekost | |
| 2004/0139085 A1 | 7/2004 | Eryurek et al. | |

FOREIGN PATENT DOCUMENTS

| | | |
|---|---|---|
| JP | 11-327636 A | 11/1999 |
| JP | 2002-117468 A | 4/2002 |
| WO | WO 03/075206 A2 | 9/2003 |

OTHER PUBLICATIONS

J. Tuszynski et al., "A Pilot Project on Alarm Reduction and Presentation Based on Multilevel Flow Models," Proceedings of the Enlarged Halden Programme Group Meeting, 2002, XP002430903, 12 pgs.
A. Henningsen, "Intelligent Alarm Handling in Cement Plants—Lessons Learned from the Nuclear Industry," Cement Industry Technical Conference 1993, Record of Conference Papers, 35th IEEE Toronto. Ont. Canada, May 23-27, 1993, pp. 165-182.

* cited by examiner

*Primary Examiner*—Daryl Pope
(74) *Attorney, Agent, or Firm*—Foley & Lardner LLP

(57) ABSTRACT

A plant monitoring apparatus includes: a process measuring unit; a warning determining unit; a warning selecting unit; a display processing unit; a display/setting unit; a warning criteria setting unit; a warning criteria database; and a warning criteria supplying unit. The warning determining unit determines a plurality of warning data to be issued as warnings from a large amount of process data collected by the process measuring unit on the basis of a predetermined determination criterion. The warning selecting unit compares the plurality of warning data with one or more classification criteria supplied by the warning criteria supplying unit so as to classify the plurality of warning data. Warnings are classified into categories according to the classification and the classified warnings are displayed on the display/setting unit.

12 Claims, 5 Drawing Sheets

HIGH LEVEL WARNING SCREEN: DISPLAY HIGH LEVEL WARNINGS
MEDIUM LEVEL WARNING SCREEN: DISPLAY MEDIUM OR HIGHER LEVEL WARNINGS
LOW LEVEL WARNING SCREEN: DISPLAY ALL WARNINGS

PLANT MONITORING APPARATUS AND PLANT MONITORING METHOD

This application claims priority from Japanese Patent Application 2006-008653, filed Jan. 17, 2006, which is incorporated herein by reference in its entirety.

BACKGROUND OF THE INVENTION

1. Field of the Invention

The present invention relates to a plant monitoring apparatus and a plant monitoring method particularly for classifying warnings into each category and displaying the classified warnings.

2. Description of the Related Art

Generally, a plant monitoring apparatus has a function for issuing warnings in a monitoring operation. This warning function provides a mechanism for determining whether warnings are to be issued when a plant monitoring apparatus enters a predetermined state during the operation of a plant, and under the determination, the warnings are notified to operators or so.

As shown in FIG. 6, a known plant monitoring apparatus 11 includes a power generation plant 12, a process measuring unit 13, a warning determining unit 14, a display processing unit 16, and a display unit 17. The process measuring unit 13 measures variables indicating states of the power generation plant 12 to obtain process data. The warning determining unit 14 determines whether a warning is to be issued on the basis of the process data and a predetermined criterion. When the warning is issued, the display processing unit 16 processes warning data into a displayable form, and supplies the data to the display unit 17. The display unit 17, in turn, displays the warning.

The plant monitoring apparatus determines whether the warning is to be issued or not according to changes of state. One of such plant monitoring apparatuses manages information supplied from sensors in an integrated fashion and sets a warning level after determining whether or not the information supplied from the sensors is normal when an error occurs (See Japanese Unexamined Patent Application Publication No. 2002-117468).

In addition, there is an apparatus that allows a user to change the plant warning level information and to store and manage the history of changes in the plant warning level information with an online operation (See Japanese Unexamined Patent Application Publication No. 11-327636).

Unfortunately, such plant monitoring apparatuses notify operators or the like of many warnings, including both critical and insignificant ones, when many warnings are issued. This circumstance is generally called a "flood of warnings". Accordingly, it is desired to efficiently notify operators of the critical warnings among the flood of warnings.

SUMMARY OF THE INVENTION

The present invention was conceived in consideration of circumstances encountered in the prior art mentioned above, and it is an object of the present invention to provide a plant monitoring apparatus and a plant monitoring method capable of efficiently notifying an operator of a plurality of critical warnings among many warnings.

This and other objects can be achieved according to the present invention by providing a plant monitoring apparatus comprising:

a process measuring unit configured to store data of a plant;

a warning determining unit operatively connected to a process measuring unit and configured to determine a plurality of warning data to be issued as warnings from a large amount of process data collected by the process measuring unit on the basis of a preliminarily set criterion;

a warning selecting unit operatively connected to the warning determining unit and configured to compare the plurality of warning data with one or more classification criteria;

a display/setting unit operatively connected to the warning selecting unit and configured to display the warning data to an operator through a display processing unit;

a warning criteria database operatively connected to the display/setting unit and configured to access the selected data through a warning criteria setting unit; and a warning criteria supplying unit operatively connected to the warning criteria database and configured to load a warning criteria from the warning criteria database to the warning selecting unit, wherein the warning selecting unit compares the plurality of warning data with one or more classification criteria supplied by the warning criteria supplying unit so as to classify the plurality of warning data, and the warnings are classified into categories according to the classification and the classified warnings are displayed on the display/setting unit.

In the above aspect, it is desirable that the classified warnings are displayed on different screens for each classification criterion. The different screens may be hierarchical screens.

It is desirable that the display/setting unit writes data in the warning criteria database through the warning criteria setting unit, and a screen displayed thereon allows specification of selected ranges of the warnings displayed according to one or more classification criteria.

It is also desirable that the selected ranges include a range written in the warning criteria database through the warning criteria setting unit and a range predetermined according to the classification criteria. The screen allowing the specification of the selected ranges of the warnings shows the number of warnings to be displayed when a currently specified range is selected. The selected ranges of the warnings may be displayed on a screen.

In another aspect of the present invention, there is provided a plant monitoring method comprising the steps of:

collecting and storing plant data obtained from a plant;

comparing the stored plant data with warning set criteria and determining a plurality of warning data to be issued as warnings on the basis of a preliminarily set criterion;

transmitting and selecting data determined to be warned;

attaching the warning data to the selected data; and classifying the warnings into categories according to the classification and displaying the classified warnings.

According to the above-described aspect of the present invention, a plant monitoring device capable of efficiently notifying operators or the like of a plurality of critical warnings among many warnings can be provided.

The nature and further characteristic features of the present invention will be made clearer from the following descriptions made with reference to the accompanying drawings.

DESCRIPTION OF THE PREFERRED EMBODIMENTS

A plant monitoring apparatus according to an embodiment of the present invention will be described hereunder with reference to the accompanying drawings.

Figure 1:
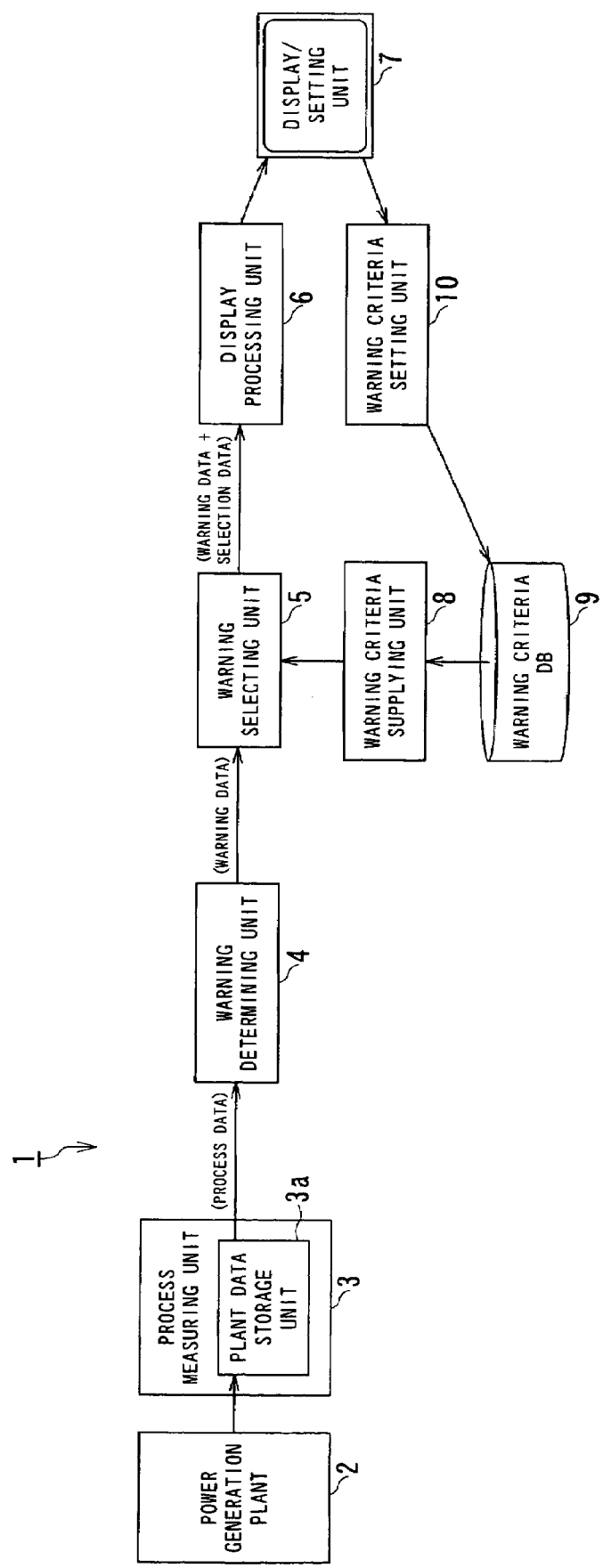
FIG. 1 is a conceptual diagram of a plant monitoring apparatus according to an embodiment of the present invention.

With reference to FIG. 1, a plant monitoring apparatus 1 according to the embodiment of the invention includes a power generation plant 2, a process measuring unit 3, a warning determining unit 4, a warning selecting unit 5, a display processing unit 6, a display/setting unit 7, a warning criteria supplying unit 8, a warning criteria database 9, and a warning criteria setting unit 10.

In these units or like, functions of the process measuring unit 3, the warning determining unit 4, the warning selecting unit 5, the display processing unit 6, the display/setting unit 7, the warning criteria supplying unit 8, the warning criteria database 9, and the warning criteria setting unit 10 are implemented by programs causing a computer to operate.

Hereunder, functions of and interrelations between the respective units will be described.

The process measuring unit 3 periodically collects process values at each input point of the power generation plant 2, and stores the process values in a plant data storage unit 3a.

The warning determining unit 4 loads the plant data stored in the plant data storage unit 3a and determines whether warning or warnings are to be issued on the basis of a predetermined criterion.

The warning selecting unit 5 adds selection data, which is described below, loaded from the warning criteria supplying unit 8 to the warning data supplied from the warning determining unit 4. The warning selecting unit 5 also compares the warning data with one or more classification criteria supplied from the warning criteria supplying unit 8 so as to classify the warnings into a plurality of categories.

The display/setting unit 7 loads the warning data, attached with the selection data by the warning selecting unit 5, through the display processing unit 6 and displays plant monitoring information to operators. In addition, in response to an interaction request from the operators, the display/setting unit 7 receives information on system screens and on monitoring range specification.

The warning criteria database 9 is accessed by the display/setting unit 7 through the warning criteria setting unit 10. The warning criteria supplying unit 8 loads warning criteria from the warning criteria database 9.

Next, with reference to a flowchart of FIG. 2, a monitoring operation performed by the plant monitoring apparatus will be described.

Figure 2:
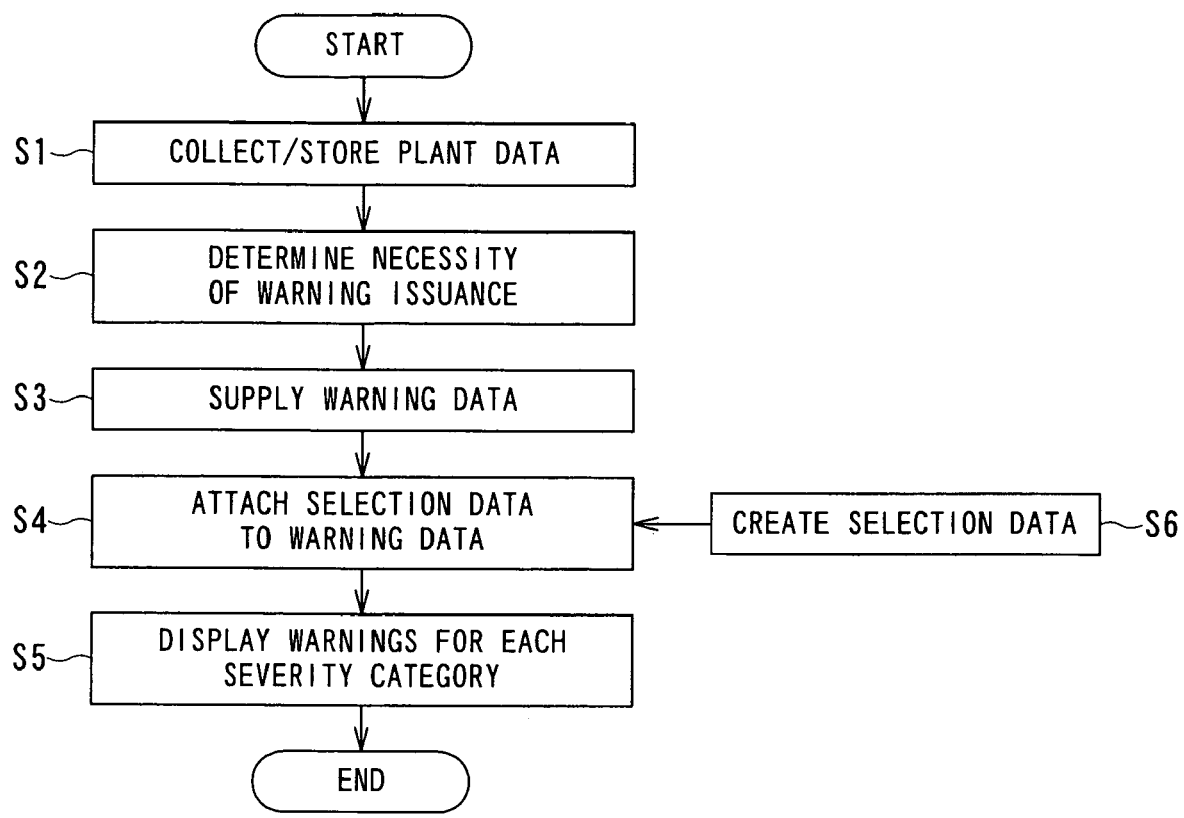
FIG. 2 is a flowchart of a monitoring operation performed by the plant monitoring apparatus according to the embodiment of the present invention.
Figure 3:
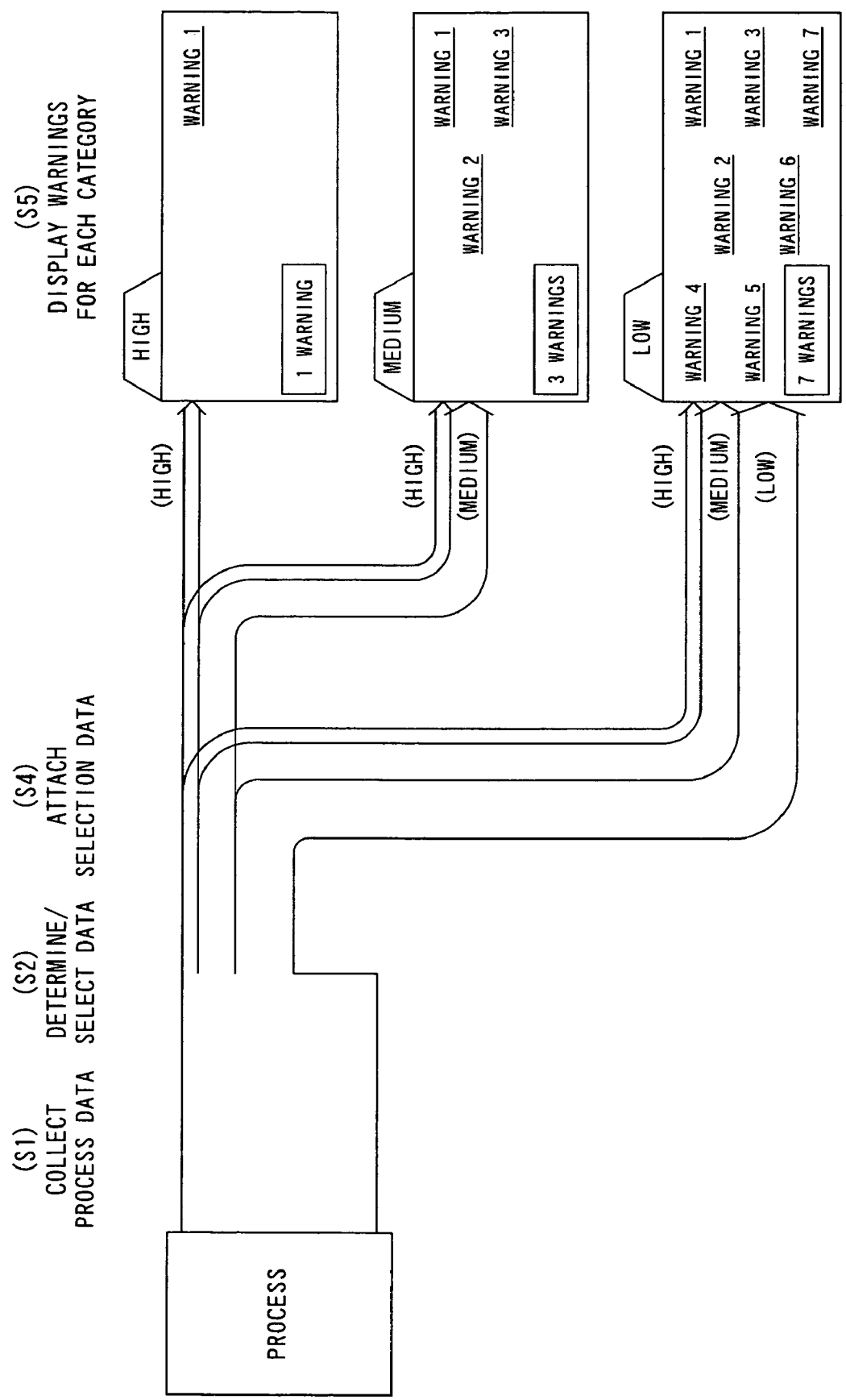
FIG. 3 is a dataflow diagram of monitoring operation associated with the number of warnings performed by the plant monitoring apparatus according to the embodiment of the present invention.

As shown in FIGS. 1 to 3, the plant measuring unit 3 periodically collects the process values at each input point of the power generation plant 2 and stores the process values in the plant data storage unit 3a (step S1).

The warning determining unit 4 loads the plant data stored in the plant data storage unit 3a and compares the plant data with a warning issuance criterion so as to determine whether or not issuance of warnings is necessary (step S2).

The warning determining unit 4 selects only data indicating the necessity of the issuance of the warnings from the loaded plant data so as to reduce the amount of warning data.

The warning determining unit 4 supplies the data determined to indicate the necessity of the issuance of the warnings to the warning selecting unit 5 as the warning data (step S3).

The warning selecting unit 5 loads the selection data from the warning criteria database 9 through the warning criteria supplying unit 8. The warning selecting unit 5 attaches the selection data to the warning data supplied from the warning determining unit 4 (step S4).

Figures 4A, 4B:
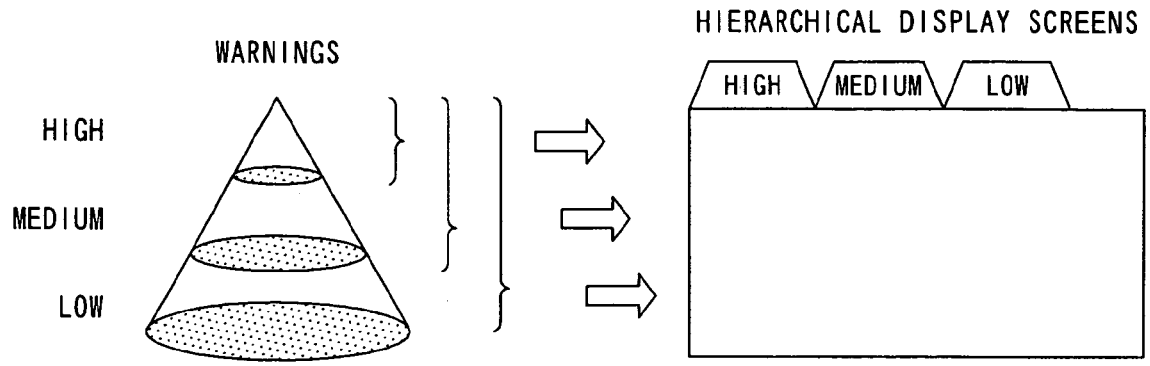
FIG. 4A is a conceptual diagram showing processing of data employed by the plant monitoring apparatus according to the embodiment of the present invention.
FIG. 4B is an example of a screen configuration employed by the plant monitoring apparatus according to the embodiment of the present invention.

FIG. 4A shows processing performed on data supplied to the display/setting unit 7 through the display processing unit 6, whereas FIG. 4B shows an example of a screen configuration.

As shown in FIGS. 4A and 4B, the selection data attached by the warning selecting unit 5 may indicate, for example, warning severity levels, such as "high", "intermediate", and "low". Referring to FIG. 4A, a vertical direction of a cone shows the warning severity levels, such as "high", "intermediate", and "low". A section of the cone in the horizontal direction conceptually shows the number of issued warnings. This example shows a circumstance where the number of "high" level warnings is few, whereas the number of warnings increases as the severity level goes down to "intermediate" and "low".

The warning data attached with the selection data by the warning selecting unit 5 is provided to the display/setting unit 7 through the display processing unit 6. The warnings corresponding to the warning data are classified into each category according to the categories of the selection data and are displayed on the display/setting unit 7 (step S5).

As shown in FIG. 4B, the classified warnings may be shown in different screens displayed on the display/setting unit 7 according to the classification criteria. For example, three hierarchical screens are displayed simultaneously and superimposed on top of each other using tags. These three screens correspond to the warning severity levels, e.g., "high", "intermediate" and "low".

More specifically, as shown in FIG. 3, the warnings having the selection data classified into the "high" severity level are displayed on a "high" level screen. Warnings having the selection data classified into the "high" and "intermediate" severity levels are displayed on a "intermediate" level screen. Likewise, the warnings having the selection data classified into the "high", "intermediate", and "low" severity levels are displayed on a "low" level screen. That is, all the warnings are displayed on the "low" level screen. Accordingly, the warnings are displayed with the number of warnings decreasing as the severity level increases. Particularly, the "high" level screen shows an extremely small number of warnings, which can prevent operators from missing the critical warnings and can ensure safety. Furthermore, the "low" level screen shows all the warnings, which allows operators to recognize the operational state of the plant through the number of warnings.

Hereunder, a step of generating the selection data (step S6) used at step S4 will be described.

Figure 5:
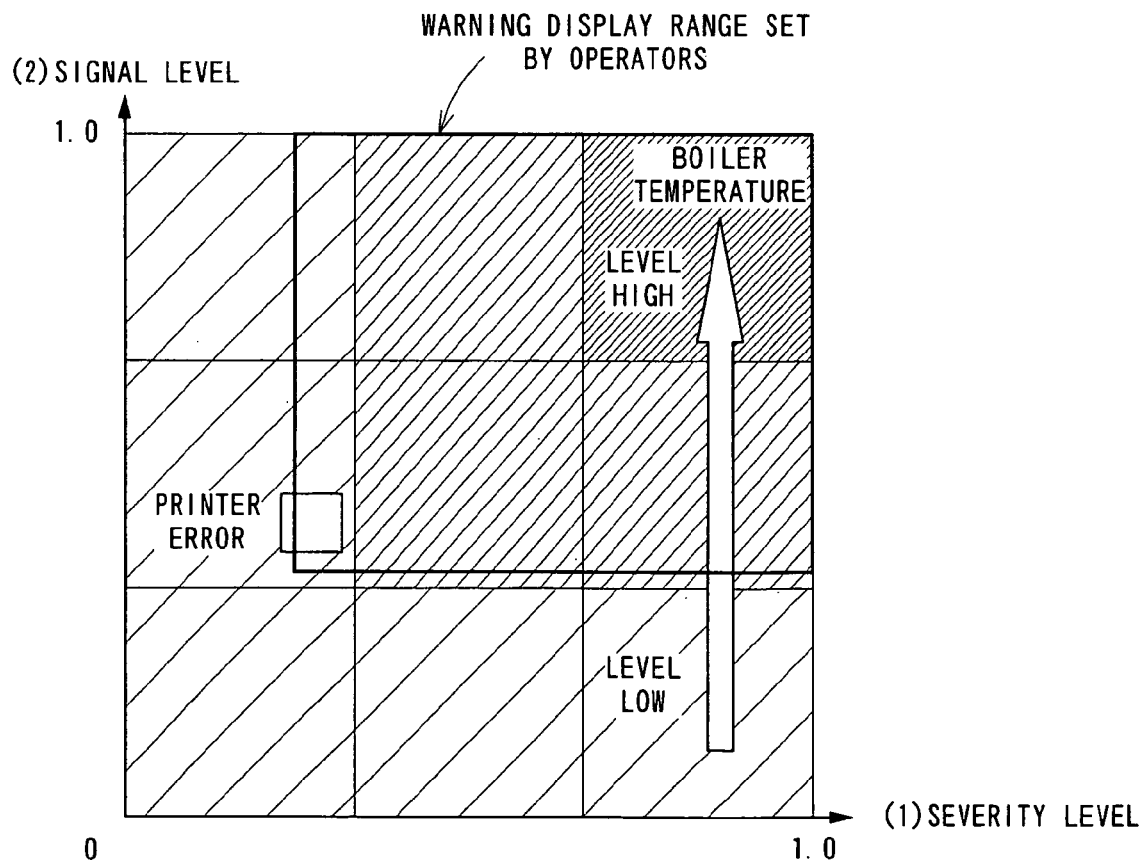
FIG. 5 is an example of a screen displayed on a display/setting unit of the plant monitoring apparatus according to the embodiment of the preset invention.
Figure 6:
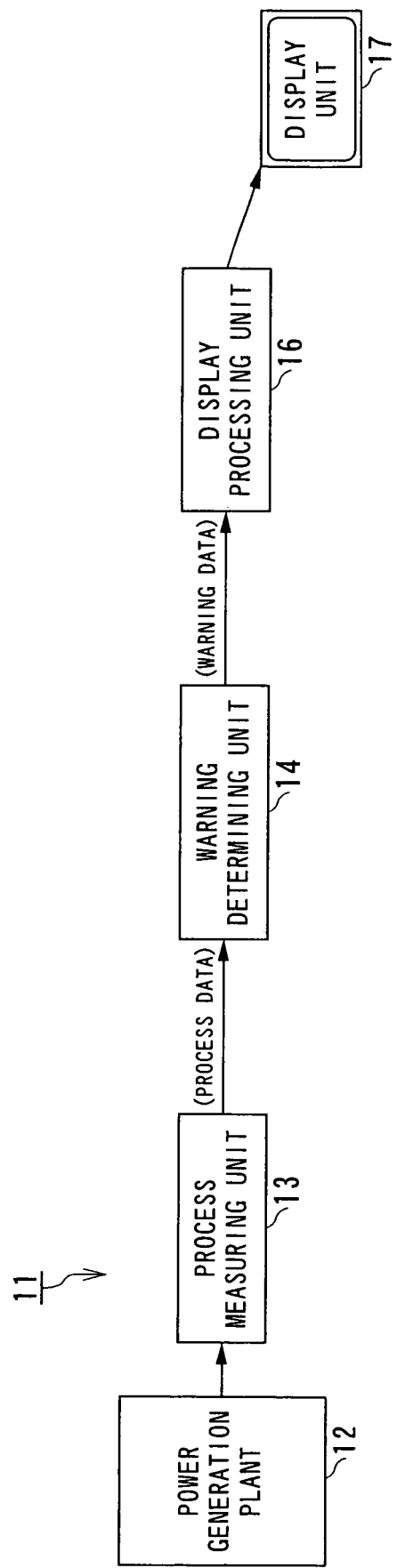
FIG. 6 is a conceptual diagram of a known plant monitoring apparatus.

FIG. 5 shows a screen example displayed on the display/setting unit 7, in which the warning criteria data is set in the warning criteria database 9 through the warning criteria setting unit 10 using the screen example.

As shown in FIG. 5, in the present embodiment, each warning is rated for two factors, that is, the first one is the severity level and the second one is a signal level.

In this example, the severity level, i.e., the first factor, is rated within a range of 0 to 1. For example, the severity level of a warning about an error in a printer connected to a plant monitoring apparatus is set at 0.2, whereas the severity level of a warning about boiler temperature is set at 0.8. The error in the printer connected to the plant monitoring apparatus does not have to be fixed until the printer is used. However, the high temperature in the boiler may cause a failure in an operation of the plant if the warning thereof is ignored. Since the warning about the high temperature in the boiler is more critical than the error in the printer, a higher value is granted to the warning about the high temperature in the boiler.

In addition, the signal level, i.e., the second factor, indicates a level regarding process quantities of each process element to be monitored. For example, the signal level corresponds to E shown by the following Equation 1, wherein T represents the temperature of the boiler, TU represents the allowable upper limit, and TL represents the lower limit.

$$E = \text{MAX}\left((TU-T)/T, (T-TL)/T\right) \quad \text{[Equation 1]}$$

In the setting screen shown in FIG. 5, the severity level, i.e., the first factor, and the signal level, i.e., the second factor, are plotted as abscissa and ordinate, respectively. An area showing warning issuance is divided into a plurality of ranges.

These ranges allow operators to specify a range corresponding to the warning severity level, such as "high" or "intermediate". In this case, the rest of the ranges correspond to a range of the "low" warning severity level. In addition, the plant monitoring apparatus may be configured to specify an area (e.g., the upper right area shown in FIG. 5) where both the signal level and the severity level are highest as a range corresponding to the "high" severity level. At this time, a method allowing operators to interactively set the warning ranges using a mouse may be used.

Preferably, each area may have a function for displaying the number of warnings currently issued. This allows operators to specify the total number of warnings to be displayed for confirmation. Additionally, at this time, it is preferable to display the warnings located at the "high" level range determined by the specification. Furthermore, preferably, the plant monitoring apparatus may have a function for displaying a screen showing current settings in order to allow operators to confirm the current warning display ranges when other operators take over from the current operators.

Accordingly, a large amount of warning data is classified into the severity levels, such as "high", "intermediate", and "low" and is displayed. This allows operators to be efficiently notified of a plurality of critical warnings.

As described above, an embodiment of the present invention implements a plant monitoring apparatus capable of efficiently notifying operators or the like of a plurality of critical warnings among many warnings by providing a warning selecting unit between a warning determining unit and a display processing unit.

What is claimed is:

1. A plant monitoring apparatus comprising:
    a process measuring unit configured to store data of a plant;
    a warning determining unit operatively connected to the process measuring unit and configured to determine a plurality of warning data to be issued as warnings from a large amount of process data collected by the process measuring unit on the basis of a preliminarily set criterion;
    a warning selecting unit operatively connected to the warning determining unit and configured to compare the plurality of warning data with one or more classification criteria;
    a display/setting unit operatively connected to the warning selecting unit and configured to display the warning data to an operator through a display processing unit;
    a warning criteria database operatively connected to the display/setting unit and configured to access selected data through a warning criteria setting unit; and
    a warning criteria supplying unit operatively connected to the warning criteria database and configured to load a warning criteria from the warning criteria database to the warning selecting unit,
    wherein the warning selecting unit compares the plurality of warning data with one or more classification criteria supplied by the warning criteria supplying unit so as to classify the plurality of warning data, and the warnings are classified into categories according to the classification and the classified warnings are displayed on the display/setting unit, respectively, on different screens for each classification criterion, the different screens being hierarchical screens.

2. The apparatus according to claim 1, wherein the display/setting unit writes data in the warning criteria database through the warning criteria setting unit, and a screen displayed thereon allows specification of selected ranges of the warnings displayed according to one or more classification criteria.

3. The apparatus according to claim 2, wherein the selected ranges include a range written in the warning criteria database through the warning criteria setting unit and a range predetermined according to the classification criteria.

4. The apparatus according to claim 2, wherein the screen allowing the specification of the selected ranges of the warnings shows the number of warnings to be displayed when a currently specified range is selected.

5. The apparatus according to claim 2, wherein the selected ranges of the warnings are displayed on a screen.

6. A plant monitoring method comprising the steps of:
    collecting and storing plant data obtained from a plant;
    comparing the stored plant data with warning set criteria and determining a plurality of warning data to be issued as warnings on the basis of a preliminarily set criterion;
    transmitting and selecting data determined to be warned;
    attaching the warning data to the selected data; and
    classifying the warnings into categories according to the classification and displaying the classified warnings on different screens for each classification category. the different screens being hierarchical screens.

7. The apparatus according to claim 1, wherein the classification criteria are based on an importance of the warning, and the hierarchy of the hierarchical screens is based on the importance of the warning.

8. The apparatus according to claim 7, wherein the classification criteria include at least a high importance criterion and a low importance criterion.

9. The apparatus according to claim 8, wherein the classification criteria include an intermediate importance criterion.

10. The method according to claim 6, wherein the classification categories are based on an importance of the warning, and the hierarchy of the hierarchical screens is based on the importance of the warning.

11. The apparatus according to claim 10, wherein the classification categories include at least a high importance criterion and a low importance criterion.

12. The apparatus according to claim 11, wherein the classification categories include an intermediate importance criterion.

* * * * *